United States Patent
Yan et al.

(10) Patent No.: US 9,674,844 B2
(45) Date of Patent: Jun. 6, 2017

(54) DEVICE AND METHOD FOR DISTRIBUTING WLAN USER POLICY

(71) Applicant: ZTE CORPORATION, Shenzhen, Guangdong Province (CN)

(72) Inventors: Wei Yan, Shenzhen (CN); Yunbo Pan, Shenzhen (CN); Yuan Wei, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 122 days.

(21) Appl. No.: 14/395,721

(22) PCT Filed: Mar. 29, 2013

(86) PCT No.: PCT/CN2013/073438
§ 371 (c)(1),
(2) Date: Oct. 20, 2014

(87) PCT Pub. No.: WO2013/155931
PCT Pub. Date: Oct. 24, 2013

(65) Prior Publication Data
US 2015/0085701 A1    Mar. 26, 2015

(30) Foreign Application Priority Data
Apr. 20, 2012 (CN) .......................... 2012 1 0118259

(51) Int. Cl.
*H04L 12/28* (2006.01)
*H04W 72/04* (2009.01)
(Continued)

(52) U.S. Cl.
CPC ..... *H04W 72/0493* (2013.01); *H04L 41/0893* (2013.01); *H04W 4/24* (2013.01); *H04W 24/00* (2013.01); *H04W 84/12* (2013.01)

(58) Field of Classification Search
CPC ... H04W 72/0493; H04W 24/00; H04W 4/24; H04W 84/12; H04L 41/0893
See application file for complete search history.

(56) References Cited

U.S. PATENT DOCUMENTS

| 8,644,833 B1 * | 2/2014 | Manning | H04W 36/0011 455/436 |
| 8,856,860 B2 * | 10/2014 | Grayson | H04L 12/66 726/1 |

(Continued)

FOREIGN PATENT DOCUMENTS

| CN | 1610305 A | 4/2005 |
| CN | 18017410 A | 7/2006 |

(Continued)

OTHER PUBLICATIONS

International Search Report (Form PCT/ISA/210) for PCT/CN2013/073438 mailed Jul. 4, 2013.
(Continued)

*Primary Examiner* — Kevin Mew
(74) *Attorney, Agent, or Firm* — Koppel, Patrick, Heybl & Philpott

(57) ABSTRACT

A Wireless Local Access Network (WLAN) user policy distribution device and method are described. One embodiment of such a device comprises: a first receiving module, configured to receive a WLAN user policy actively sent by an upstream policy decision distribution device; and a first forwarding module, configured to forward the WLAN user policy to a WLAN user policy execution device. Through the technical solution provided in one embodiment of such a device, the absence of a necessary policy control management mechanism in the existing WLAN is solved, thereby implementing the WLAN user policy control effectively.

8 Claims, 6 Drawing Sheets

(51) Int. Cl.
*H04W 24/00* (2009.01)
*H04L 12/24* (2006.01)
*H04W 4/24* (2009.01)
*H04W 84/12* (2009.01)

(56) References Cited

U.S. PATENT DOCUMENTS

| | | | |
|---|---|---|---|
| 9,009,293 B2* | 4/2015 | Batz | H04L 43/026 370/235 |
| 9,380,446 B2* | 6/2016 | Zhou | H04W 8/02 |
| 2003/0148777 A1* | 8/2003 | Watanabe | H04W 68/04 455/458 |
| 2003/0182431 A1* | 9/2003 | Sturniolo | H04L 63/0272 709/227 |
| 2005/0135375 A1 | 6/2005 | Hurtta | |
| 2007/0240209 A1* | 10/2007 | Lewis | H04W 80/06 726/15 |
| 2008/0039104 A1* | 2/2008 | Gu | H04W 8/04 455/445 |
| 2008/0051076 A1* | 2/2008 | O'Shaughnessy | G06F 21/305 455/419 |
| 2008/0052383 A1* | 2/2008 | O'Shaughnessy | H04L 67/34 709/223 |
| 2008/0261593 A1* | 10/2008 | Wong | H04W 72/048 455/435.1 |
| 2009/0196231 A1* | 8/2009 | Giaretta | H04L 12/14 370/328 |
| 2009/0207757 A1* | 8/2009 | Andreasen | H04L 12/1403 370/254 |
| 2009/0215438 A1* | 8/2009 | Mittal | H04M 3/42195 455/418 |
| 2009/0320089 A1* | 12/2009 | Lyons | G06F 21/57 726/1 |
| 2010/0287599 A1* | 11/2010 | He | H04L 12/14 726/1 |
| 2010/0298004 A1* | 11/2010 | Rune | H04L 63/20 455/450 |
| 2011/0199979 A1* | 8/2011 | Di | H04M 15/66 370/328 |
| 2011/0289202 A1 | 11/2011 | Riley | |
| 2012/0016995 A1* | 1/2012 | You | H04L 12/14 709/226 |
| 2012/0021741 A1* | 1/2012 | Pancorbo Marcos | H04L 12/14 455/433 |
| 2012/0198512 A1* | 8/2012 | Zhou | H04L 47/122 726/1 |
| 2012/0281672 A1* | 11/2012 | Ohm | H04B 7/185 370/331 |
| 2013/0151710 A1* | 6/2013 | D'Souza | H04L 41/08 709/226 |
| 2014/0040975 A1* | 2/2014 | Raleigh | H04W 12/12 726/1 |

FOREIGN PATENT DOCUMENTS

| | | |
|---|---|---|
| CN | 1859336 A | 11/2006 |
| CN | 101640896 A | 2/2010 |
| WO | WO 2008/149326 | 12/2008 |

OTHER PUBLICATIONS

European Search Report re: application No. 13777512.8 PCT/CN2013073438 dated Jul. 21, 2015.

* cited by examiner

DEVICE AND METHOD FOR DISTRIBUTING WLAN USER POLICY

FIELD OF THE INVENTION

The disclosure relates to the field of communications, in particular to a device and a method for distributing a Wireless Local Access Network (WLAN) user policy.

BACKGROUND OF THE INVENTION

With the advent of the mobile broadband era, a dream of "surfing on the wireless internet anytime and anywhere" is gradually coming true. The 3rd Generation (3G)/Long Term Evolution (LTE) brings much hope to people, and is greatly improved in the mobile communication rate compared with the 2nd Generation (2G) technology so as to be enough to improve the life style of people. People not only can enjoy the communication service of calling anytime and anywhere but also can surf on the internet, download music, play games on the internet, watch video, chat online etc. anytime and anywhere. In conclusion, everything is mobile in the internet now, and the era of mobile internet has come.

As a mature and highly-recognized wireless broadband access technology, the WLAN is an effective supplement to the fixed broadband access and the mobile data service. For the fixed broadband access, the WLAN provides wireless extension of the last 100 m access, so as to bring much convenience to users and implement the mobility of the fixed broadband access. For the mobile data service, the WLAN can effectively relieve the broadband and network load pressure of a cellular network at a hotspot region and effectively reduce the deployment cost, and provides a user with a good high-speed mobile internet experience and highlights the advantages of the cellular network.

In term of the development history of the WLAN architecture, the home WLAN is developed at first, which does not need to consider operation and management and adopts FAT Access Point (FAT AP), then it is developed to an enterprise WLAN, which has a simple network management requirement, and finally, it is developed to a carrier-class network, which is complex in network structure and large in network size and sets the operation and management as the first task.

By integrating the fixed broadband, the cellular network and the WLAN, the problems of internet convenience and bandwidth are solved for users and the user experience is improved greatly, but it is necessary to consider the new characteristics and new problem of the WLAN carrier-class network prospectively. Compared with the home network and the enterprise WLAN, the carrier-class WLAN has the following problems to be solved when deployed by an operator.

(1) integration of the cellular network and the WLAN: uniform authentication/uniform charging, user policy control and management, carrier-class WLAN equipment and dual-mode terminal, switching and flow migration between heterogeneous networks.

(2) fine service assurance: flow centralized control, secure access and seamless switching of flow.

(3) low-cost construction: centralized deployment and uniform management of Access Control (AC), carrier-class high-capacity and high-performance AC, and high-reliability and high-capacity intelligent AP.

(3) uniform operation and maintenance: management of a large number of APs, uniform management of the WLAN and bearer equipment, quick deployment, and simple operation and maintenance.

With the development of the mobile internet, the mobile data service has an increasingly amount of users and flow, accordingly, a lot of new topics are emerging. For example, how to guarantee user experience of a VIP client and provide a differentiated service, how to rationally control the long-time occupancy of radio resources of an instant message service, such as QQ and Fetion, how to effectively control the user who pays monthly and is not limited in bandwidth not to affect their user experience obviously but to reduce the influence on the usage experience of other users in a specific period, how to ensure a high-value user, such as stream media, and how to manage and control a low-value service, such as P2P.

In the WLAN network, operators cannot monitor and rationally allocate WLAN network resources and effectively control the network serviceability due to absence of necessary policy control and management mechanism, which is not convenient to improve the user experience. Therefore, a policy control and management mechanism is needed in the WLAN network to provide finer service flow management for users based on the user subscription, thereby guaranteeing the user experience.

In view of the requirements and problems above, there is no effective solution currently.

SUMMARY OF THE INVENTION

The disclosure provides a device and a method for distributing a WLAN user policy, so as to at least solve one of the problems above.

In one aspect, a device for distributing a WLAN user policy is provided, including: a first receiving module, configured to receive a WLAN user policy actively sent by an upstream policy decision distribution device; and a first forwarding module, configured to forward the WLAN user policy to a WLAN user policy execution device.

The device may further include: a second receiving module, configured to receive a WLAN user policy request from the WLAN user policy execution device; a second forwarding module, configured to forward the WLAN user policy request to the upstream policy decision distribution device; a third receiving module, configured to receive a WLAN user policy corresponding to the WLAN user policy request from the upstream policy decision distribution device; and a third forwarding module, configured to forward the WLAN user policy corresponding to the WLAN user policy request to the WLAN user policy execution device.

The device may further include: a first sending module, configured to actively send a WLAN user policy request to the upstream policy decision distribution device; a fourth receiving module, configured to receive the WLAN user policy corresponding to the WLAN user policy request actively sent by the first sending module from the upstream policy decision distribution device; and a fourth forwarding module, configured to forward the WLAN user policy corresponding to the WLAN user policy request actively sent by the first sending module to the WLAN user policy execution device.

The WLAN user policy actively sent by the upstream policy decision distribution device includes: a WLAN user policy sent from the upstream policy decision distribution device which knows the access of a WLAN user terminal according to the WLAN user identifier of the WLAN user terminal and corresponding to the WLAN user terminal.

The WLAN user policy request sent by the WLAN user policy execution device includes: a WLAN user policy request sent from the WLAN user policy execution device which knows the access of a WLAN user terminal or establishes a bearer path for the WLAN user terminal to the second receiving module, wherein the WLAN user policy request includes the WLAN user identifier of the WLAN user terminal.

The first sending module is configured to actively send a WLAN user policy request to the upstream policy decision distributing device after knowing the access of a WLAN user terminal, wherein the WLAN user policy request includes the WLAN user identifier of the WLAN user terminal.

The device may further include: a first judgment module, which is configured to, after the second receiving module receives the WLAN user policy request from the WLAN user policy execution device, judge whether a WLAN user policy corresponding to the WLAN user policy request is saved locally, if so, directly send the WLAN user policy to the WLAN user policy execution device, otherwise, trigger the second forwarding module.

The device may further include: a second judgment module, which is configured to, after knowing the access of a WLAN user terminal, judge whether the WLAN user policy corresponding to the WLAN user terminal is saved locally, if so, directly send the WLAN user policy to the WLAN user policy execution device, otherwise, trigger the first sending module.

In another aspect, the disclosure provides a method for distributing a WLAN user policy, including the following steps that: a WLAN user policy distribution device receives a WLAN user policy actively sent by an upstream policy decision distribution device; and the WLAN user policy distribution device forwards the WLAN user policy to a WLAN user policy execution device.

The method may further include the following steps that: the WLAN user policy distribution device receives a WLAN user policy request from the WLAN user policy execution device and forwards the WLAN user policy request to the upstream policy decision distribution device; and the WLAN user policy distribution device receives a WLAN user policy corresponding to the WLAN user policy request from the upstream policy decision distribution device and forwards the WLAN user policy to the WLAN user policy execution device.

The method may further include the following steps that: the WLAN user policy distribution device actively sends a WLAN user policy request to the upstream policy decision distribution device; and the WLAN user policy distribution device receives the WLAN user policy corresponding to the WLAN user policy request actively sent thereby from the upstream policy decision distribution device and forwards the WLAN user policy to the WLAN user policy execution device.

The WLAN user policy actively sent by the upstream policy decision distribution device includes: a WLAN user policy sent by the upstream policy decision distribution device which knows the access of a WLAN user terminal according to the WLAN user identifier of the WLAN user terminal and corresponding to the WLAN user terminal.

The WLAN user policy request sent by the WLAN user policy execution device includes: a WLAN user policy request sent from the WLAN user policy execution device which knows the access of a WLAN user terminal or establishes a bearer path for the WLAN user terminal to the WLAN user policy execution device, wherein the WLAN user policy request includes the WLAN user identifier of the WLAN user terminal.

The WLAN user policy request actively sent from the WLAN user policy distribution device to the upstream policy decision distribution device includes: a WLAN user policy request actively sent from the WLAN user policy distribution device which knows the access of a WLAN user terminal to the upstream policy decision distribution device, wherein the WLAN user policy request includes the WLAN user identifier of the WLAN user terminal.

After the WLAN user policy distribution device receives the WLAN user policy request from the WLAN user policy execution device, the method may further include the following steps that: the WLAN user policy distribution device judges whether a WLAN user policy corresponding to the WLAN user policy request is locally saved; if so, the WLAN user policy is directly sent to the WLAN user policy execution device; otherwise, the WLAN user policy request is forwarded to the upstream policy decision distribution device.

After the WLAN user policy distribution device knows the access of a WLAN user terminal, the method may further include the following steps that: the WLAN user policy distribution device judges whether a WLAN user policy corresponding to the WLAN user terminal is locally saved; if so, the WLAN user policy is directly sent to the WLAN user policy execution device; otherwise, the WLAN user policy request is actively sent to the upstream policy decision distribution device.

With the disclosure, the solution that the WLAN user policy distribution device is configured to receive the WLAN user policy sent by the upstream policy decision distribution device and forward it to the WLAN user policy execution device is adopted to solve the absence of necessary policy control and management mechanism in the existing WLAN, thereby achieving an effective WLAN user policy control effect.

BRIEF DESCRIPTION OF THE DRAWINGS

The drawings illustrated here are to provide further understanding of the disclosure and constitute one part of the application, and the exemplary embodiments of the disclosure and the explanations thereof are intended to explain the disclosure, instead of improperly limiting the disclosure. In the drawings.

DETAILED DESCRIPTION OF THE EMBODIMENTS

The disclosure will be described below in reference to the drawings and the embodiments in detail. It should be noted that, in case of no conflict, the embodiments of the application and features therein can be combined with one another.

Figure 1:
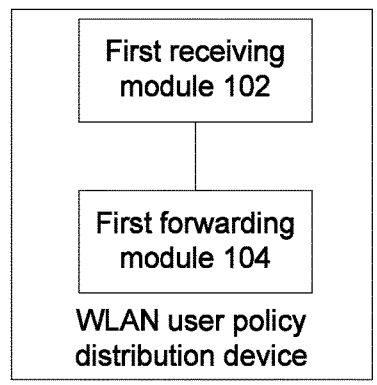
FIG. 1 is a structure diagram of a device for distributing a WLAN user policy according to an embodiment of the disclosure.

FIG. 1 is a structure diagram of a device for distributing a WLAN user policy according to an embodiment of the disclosure. As shown in FIG. 1, the device for distributing a WLAN user policy according to an embodiment of the disclosure includes:

a first receiving module 102, configured to receive a WLAN user policy actively sent by an upstream policy decision distribution device; and a first forwarding module 104, connected to the first receiving module 102 and configured to forward the WLAN user policy to a WLAN user policy execution device.

The device for distributing a WLAN user policy provided in the embodiment provides a platform for implementing a WLAN policy control and management mechanism, wherein the first receiving module 102 may receive a WLAN user policy for a specific WLAN user from an upstream policy decision distribution device, while the first forwarding module 104 may forward the WLAN user policy to a corresponding WLAN user policy execution device for execution, so as to implement the WLAN user policy control conveniently and quickly and implement a basic WLAN policy control and management mechanism. According to a common calling way in the field, the upstream policy decision distribution device, the WLAN user policy distribution device and the WLAN user policy execution device may be called an upstream policy decision distribution function, a WLAN user policy distribution function and a WLAN user policy execution function in term of the function and may be called an upstream policy decision distribution point, a WLAN user policy distribution point and a WLAN user policy execution point in term of the network architecture, and they are substantially the same whatever they are called.

Figure 2:
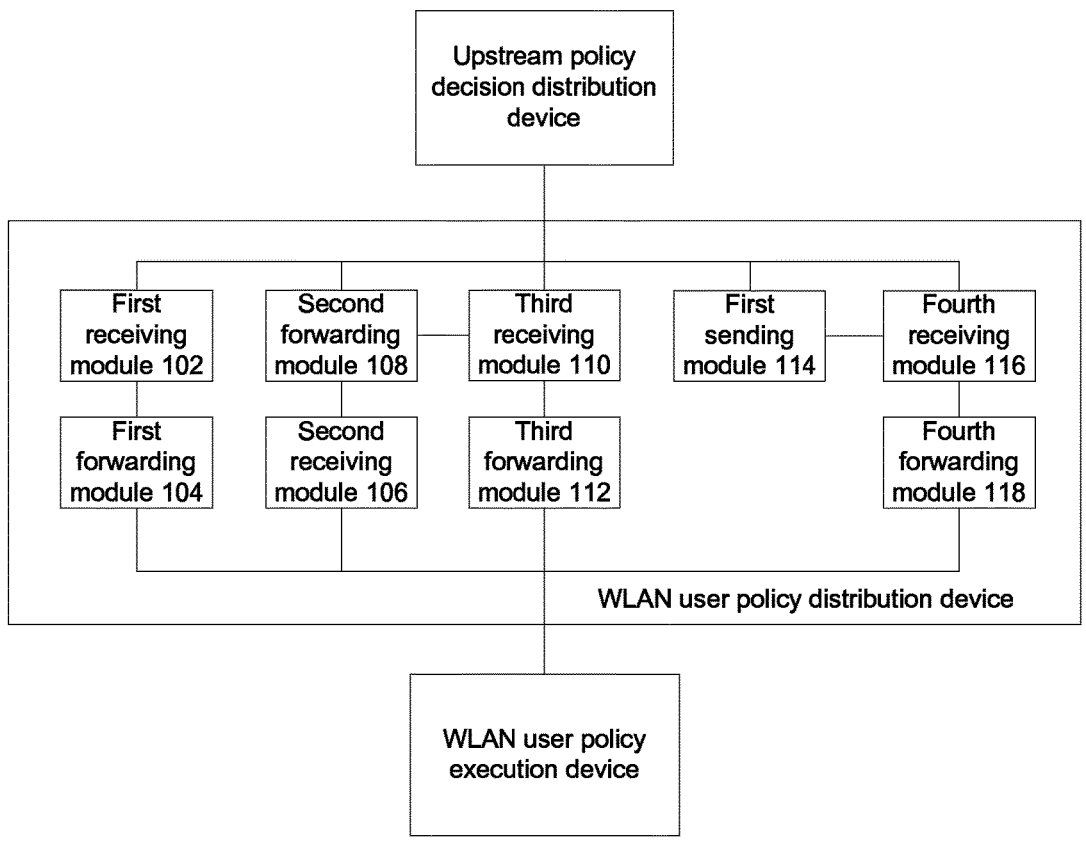
FIG. 2 is a structure diagram of a device for distributing a WLAN user policy according to a preferred embodiment of the disclosure.

In a preferred embodiment of the disclosure, another WLAN user policy control mechanism is provided. Preferably, as shown in FIG. 2, the device for distributing a WLAN user policy according to the preferred embodiment of the disclosure includes:

a second receiving module 106, configured to receive a WLAN user policy request from the WLAN user policy execution device;

a second forwarding module 108, connected to the second receiving module 106 and configured to forward the WLAN user policy request to the upstream policy decision distribution device;

a third receiving module 110, connected to the second forwarding module 108 and configured to receive a WLAN user policy corresponding to the WLAN user policy request from the upstream policy decision distribution device; and a third forwarding module 112, connected to the third receiving module 110 and configured to forward the WLAN user policy corresponding to the WLAN user policy request to the WLAN user policy execution device.

The module provided in the preferred embodiment establishes another WLAN user policy control mechanism, namely, the second receiving module 106 receives a WLAN user policy request from the WLAN user policy execution device, the second forwarding module 108 forwards the WLAN user policy request to the upstream policy decision distribution device so that the upstream policy decision distribution device sends a corresponding WLAN user policy; and after the third receiving module 110 receives the WLAN user policy, the third forwarding module 112 forwards it to the WLAN user policy execution device which initially sends the WLAN user policy request for execution, thereby implementing the WLAN user policy control finally. Another train of thought provided by the preferred embodiment of the disclosure can also implement the basic WLAN policy control and management mechanism. It should be noted that the modules above are relatively independent from the first receiving module 102 and the first forwarding module 104.

In the preferred embodiment of the disclosure, another WLAN user policy control mechanism is further provided. Preferably, as shown in FIG. 2, the WLAN user policy distribution device according to the preferred embodiment of the disclosure may further include:

a first sending module 114, configured to actively send a WLAN user policy request to the upstream policy decision distribution device;

a fourth receiving module 116, connected to the first sending module 114 and configured to receive the WLAN user policy corresponding to the WLAN user policy request actively sent by the first sending module 114 from the upstream policy decision distribution device; and a fourth forwarding module 118, connected to the fourth receiving module 116 and configured to forward the WLAN user policy corresponding to the WLAN user policy request actively sent by the first sending module 114 to the WLAN user policy execution device.

The module provided by the preferred embodiment further establishes a WLAN user policy control mechanism, namely, the first sending module 114 actively sends the WLAN user policy request to the upstream policy decision distribution device so that the upstream policy decision distribution device sends a corresponding WLAN user policy; and after the fourth receiving module 116 receives the WLAN user policy, the fourth forwarding module 118 forwards it to the corresponding WLAN user policy execution device for execution, thereby implementing the WLAN user policy control finally. Another train of thought provided by the preferred embodiment of the disclosure can also implement the basic WLAN policy control and management mechanism. It should be noted that the modules above are relatively independent from the first receiving module 102, the first forwarding module 104, the second receiving module 106, the second forwarding module 108, the third receiving module 110 and the third forwarding module 112.

The embodiments and the preferred embodiments above provide three kinds of thoughts for implementing the WLAN policy control and management mechanism, and their solutions start from the following process that: the upstream policy decision distribution device actively sends the WLAN user policy, or the WLAN user policy execution device sends the WLAN user policy request, the WLAN user policy distribution device actively sends the WLAN user policy request to the upstream policy decision distribution device. Preferably, a condition may be set to trigger theses solutions, namely, the operation above is started under some condition to implement the WLAN policy control. For example, it is triggered in response to the instruction of a manager, or triggered in case of the degradation of the network environment, or triggered in a specific period. In the preferred embodiment, a preferred way is provided as follows.

Preferably, the WLAN user policy actively sent by the upstream policy decision distribution device includes: a WLAN user policy sent by the upstream policy decision distribution device which knows the access of a WLAN user terminal according to the WLAN user identifier of the WLAN user terminal and corresponding to the WLAN user terminal; and/or the WLAN user policy request sent by the WLAN user policy execution device includes: a WLAN user policy request sent from the WLAN user policy execution device which knows the access of a WLAN user terminal or establishes a bearer path for the WLAN user terminal to the second receiving module 106 (the WLAN user policy distribution device), wherein the WLAN user policy request includes the WLAN user identifier of the WLAN user terminal; and/or the first sending module 114 may be configured to actively send a WLAN user policy request to the upstream policy decision distributing device after knowing the access of a WLAN user terminal, wherein the WLAN user policy request includes the WLAN user identifier of the WLAN user terminal.

In the preferred embodiment, to further describe the WLAN user policy actively sent by the upstream policy decision distribution device and the WLAN user policy request sent by the WLAN user policy execution device as well as the function of the first sending module 114, a preferred condition for triggering the WLAN user policy control is given. Namely, after the access of a WLAN user terminal to the WLAN is known, the WLAN user terminal can be subjected to policy control no matter the upstream policy decision distribution device, the WLAN user policy distribution device (the first sending module 114) or the WLAN user policy execution device knows that the WLAN user terminal accesses the WLAN. Therefore, each WLAN user terminal can be subjected to policy control, and accordingly, the WLAN policy control and management mechanism is implemented to the maximum extent. It should be noted that one or more of the solutions for implementing the WLAN policy control and management mechanism can be selected and the triggering conditions can be combined in various ways, so that the triggering conditions given in the preferred embodiment are in and/or relationship.

A WLAN can be established according to the embodiment and the preferred embodiment above, including: an upstream policy decision distribution device, a WLAN user policy distribution device and a WLAN user policy execution device (which are called an upstream policy decision distribution function, a WLAN user policy distribution function and a WLAN user policy execution function respectively in the preferred embodiment). Of course, these functions may be arranged outside the WLAN instead of being arranged inside the WLAN, but they can also implement the WLAN policy control finally. Therefore, these functions can also be considered to belong to the WLAN logically. In the WLAN, the WLAN policy control and management mechanism is: the WLAN user policy distribution function receives a WLAN user policy actively sent by the upstream policy decision distribution function and forwards it to the WLAN user policy execution function; the WLAN user policy distribution function receives a WLAN user policy request from the WLAN policy execution function, replaces the WLAN policy execution function to request the upstream policy decision distribution function for the WLAN user policy and forwards the WLAN user policy to the WLAN user policy execution function; the WLAN user policy distribution function actively requests the upstream policy decision distribution function for a WLAN user policy and forwards it to the WLAN user policy execution function.

Preferably, in order to further improve the efficiency of the WLAN policy control, the WLAN user policy distribution device according to a preferred embodiment of the disclosure may further include:

a first judgment module (not shown in the drawings), connected to the second receiving module 106 and configured to, after the second receiving module 106 receives the WLAN user policy request from the WLAN user policy execution device, judge whether a WLAN user policy corresponding to the WLAN user policy request is saved locally, if so, directly send the WLAN user policy to the WLAN user policy execution device, otherwise, trigger the second forwarding module; and/or a second judgment module (not shown in the drawings), connected to the first sending module 114, and configured to judge whether the WLAN user policy of the WLAN user terminal is locally saved after the access of the WLAN user terminal is known, if so, directly send the WLAN user policy to the WLAN user policy execution device, otherwise, trigger the first sending module 114.

When receiving the WLAN user policy request sent by the WLAN user policy execution device or the WLAN user policy request to be actively sent, the WLAN user policy distribution device may judge whether the required WLAN user policy is locally saved at first (for example, when the current WLAN user terminal is not subjected to policy control for the first time, the WLAN user policy of the WLAN user terminal may be saved locally); if so, the WLAN user policy is directly sent, so that the WLAN policy control efficiency can be improved greatly, and the subsequent operation is not needed unless the required WLAN user policy is not saved locally. It should be noted that one or both of the two modules can be arranged.

Figure 3:
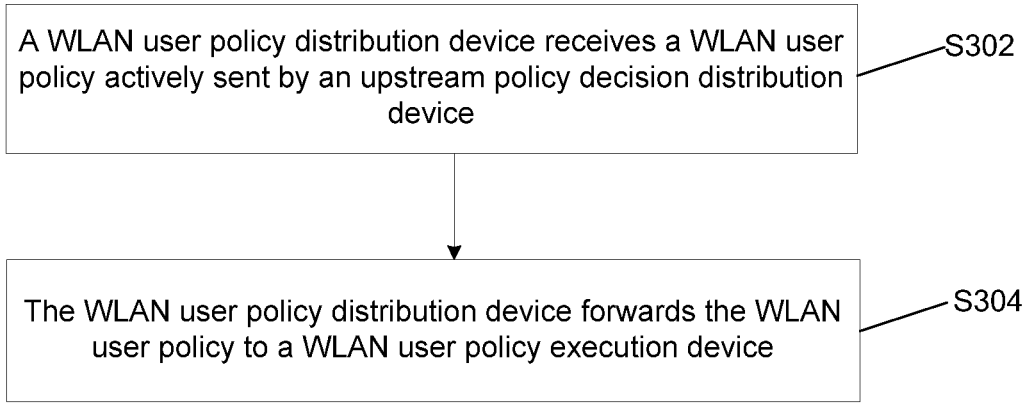
FIG. 3 is a flowchart of a method for distributing a WLAN user policy according to an embodiment of the disclosure.

FIG. 3 is a flowchart of a method for distributing a WLAN user policy according to an embodiment of the disclosure. As shown in FIG. 3, the method for distributing a WLAN user policy according to an embodiment of the disclosure includes the following steps (Step 302-Step 304).

Step 302, A WLAN user policy distribution device receives a WLAN user policy actively sent by an upstream policy decision distribution device.

Step 304, The WLAN user policy distribution device forwards the WLAN user policy to a WLAN user policy execution device.

By the method for distributing a WLAN user policy provided in the embodiment, a WLAN user can be subjected to policy control conveniently and quickly, thereby implementing a basic WLAN policy control and management mechanism. According to a common calling way in the field, the upstream policy decision distribution device, the WLAN user policy distribution device and the WLAN user policy execution device can also be called an upstream policy decision distribution function, a WLAN user policy distribution function and a WLAN user policy execution function, or an upstream policy decision distribution point, a WLAN user policy distribution point and a WLAN user policy execution point.

Preferably, the method for distributing a WLAN user policy according to the preferred embodiment of the disclosure may further include the following steps that:

the WLAN user policy distribution device receives a WLAN user policy request from the WLAN user policy execution device and forwards it to the upstream policy decision distribution device; and the WLAN user policy distribution device receives the WLAN user policy corresponding to the WLAN user policy request from the upstream policy decision distribution device and forwards it to the WLAN user policy execution device.

By another policy control method for the WLAN user terminal provided by the preferred embodiment of the disclosure, the basic WLAN policy control and management mechanism can also be implemented. The steps above are relatively independent from Step 302 and Step 304.

Preferably, the method for distributing a WLAN user policy according to the preferred embodiment of the disclosure may further include the following steps that:

the WLAN user policy distribution device actively sends a WLAN user policy request to the upstream policy decision distribution device; and the WLAN user policy distribution device receives the WLAN user policy corresponding to the WLAN user policy request actively sent by the WLAN user policy distribution device from the upstream policy decision distribution device and forwards it to the WLAN user policy execution device.

By another policy control method for the WLAN user terminal provided by the preferred embodiment of the disclosure, the basic WLAN policy control and management mechanism can also be implemented. The steps above are relatively independent from the steps in the method embodiment and the preferred method embodiments.

Preferably, a condition may be further set for the execution of the method, namely, the method is executed in some conditions to perform policy control on the WLAN user. For example, it is triggered in response to the instruction of a manager, triggered in case of the degradation of the network environment or triggered in a specific period. In the preferred embodiment, a preferred way is provided.

The WLAN user policy actively sent by the upstream policy decision distribution device includes: a WLAN user policy sent by the upstream policy decision distribution device which knows the access of a WLAN user terminal according to the WLAN user identifier of the WLAN user terminal and corresponding to the WLAN user terminal; and/or the WLAN user policy request sent by the WLAN user policy execution device includes: a WLAN user policy request sent from the WLAN user policy execution device which knows the access of a WLAN user terminal or establishes a bearer path for the WLAN user terminal to the WLAN user policy execution device, wherein the WLAN user policy request includes the WLAN user identifier of the WLAN user terminal; and/or the WLAN user policy request actively sent from the WLAN user policy distribution device to the upstream policy decision distribution device includes: a WLAN user policy request actively sent from the WLAN user policy distribution device which knows the access of a WLAN user terminal to the upstream policy decision distribution device, wherein the WLAN user policy request includes the WLAN user identifier of the WLAN user terminal.

In the preferred embodiment, a preferred condition for triggering the WLAN user policy control is given, namely, after the access of a WLAN user terminal to a WLAN is known, the WLAN user terminal is subjected to policy control. By doing so, each WLAN user terminal can be subjected to policy control, thereby implementing the WLAN policy control and management mechanism to the maximum extent. It should be noted that one or more of the methods for implementing the WLAN policy control and management mechanism can be selected and the triggering conditions can be combined in various ways, so that the triggering conditions given in the preferred embodiment are in and/or relationship.

Preferably, after the WLAN user policy distribution device receives the WLAN user policy request from the WLAN user policy execution device, the method may further include the following steps that: the WLAN user policy distribution device judges whether a WLAN user policy corresponding to the WLAN user policy request is locally saved; if the WLAN user policy corresponding the WLAN user policy request is locally saved, the WLAN user policy is directly sent to the WLAN user policy execution device; otherwise, the WLAN user policy request is forwarded to the upstream policy decision distribution device; and/or after the WLAN user policy distribution device knows the access of a WLAN user terminal, the method may further include the following steps that: the WLAN user policy distribution device judges whether a WLAN user policy corresponding to the WLAN user terminal is locally saved; if the WLAN user policy corresponding the WLAN user policy request is locally saved, the WLAN user policy is directly sent to the WLAN user policy execution device; otherwise, the WLAN user policy request is actively sent to the upstream policy decision distribution device.

The operation above further improves the efficiency of the WLAN policy control, and the process of implementing the WLAN user policy can be shortened greatly if the required WLAN user policy is locally saved in the WLAN user policy distribution device.

The embodiment and the preferred embodiment are described below through an example in detail.

Figure 4:
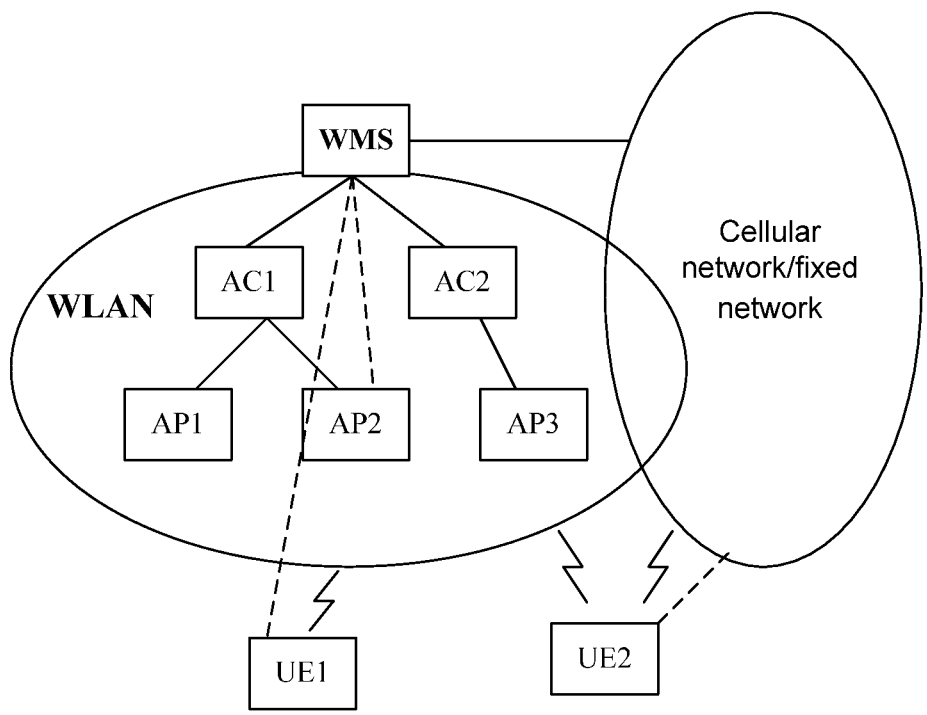
FIG. 4 is a network structure schematic of an operable and manageable WLAN according to an embodiment of the disclosure.

FIG. 4 is a network structure schematic of an operable and manageable WLAN according to an embodiment of the disclosure, wherein the diagram showing the connection of a communication network shown here is the basic scenario of each example below. A cellular/WLAN convergence network is shown in FIG. 4, wherein, a WLAN hotspot consists of a plurality of Access Points (APs) continuously covered, and the WLAN terminal can move and switch freely in the WLAN hotspot, but the service keeps continuous. The WLAN hotspot can access the cellular network through an AC.

User Equipment 1 (UE1) is a WLAN terminal and accesses a network through a WLAN hotspot to access various services, and UE2 is a WLAN/cellular multi-mode terminal, which can access the network through the WLAN and the cellular network at the same time and move smoothly and switch between the WLAN and the cellular network.

In FIG. 4, a WLAN Mobility Server (WMS), as a control interface between the cellular network and the WLAN, helps the uniform management of the convergence network, the switching between heterogeneous networks and the flow migration, and also help a terminal implement safe and fast access and seamless switching in the WLAN so as to solve such problems of positioning, roaming and mobility support of the terminal in the WLAN. The WMS is deployed centrally to implement the uniform management for the user status information and can also be deployed quickly and operated and maintained simply.

Figure 5:
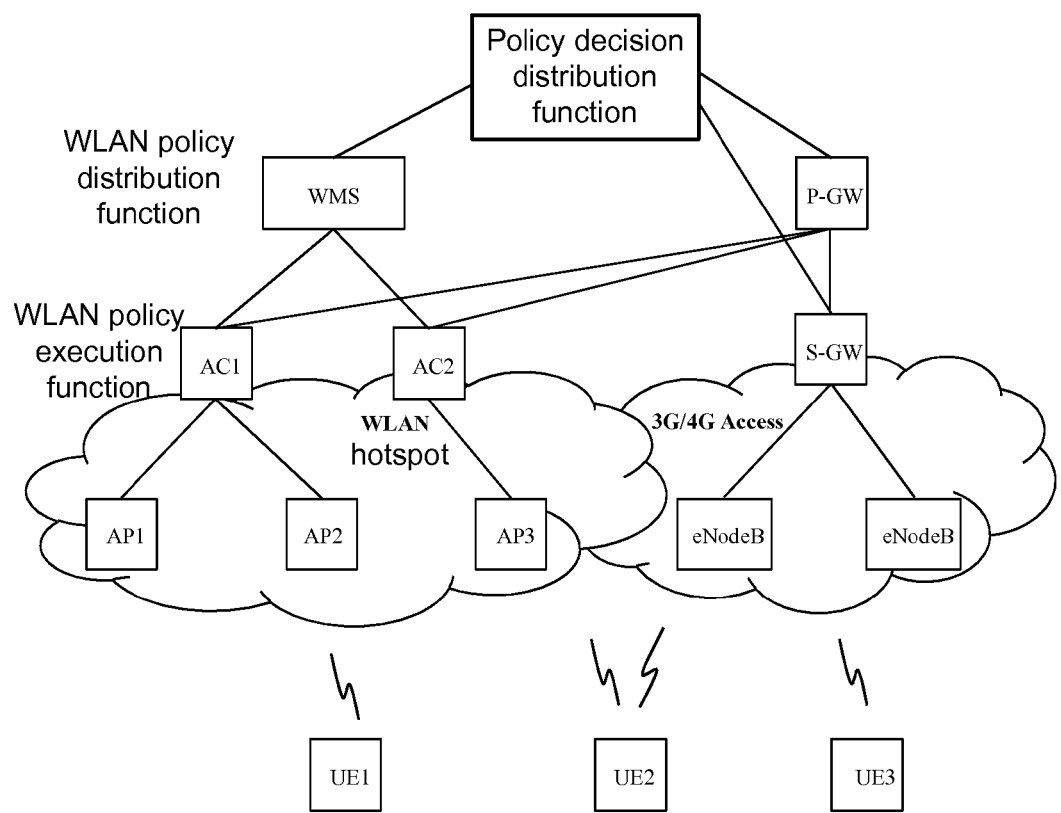
FIG. 5 is a policy control and management architecture schematic of a WLAN hotspot and a cellular converged network according to an embodiment of the disclosure.

FIG. 5 is a policy control and management architecture of a WLAN hotspot and a cellular converged network according to an embodiment of the disclosure. The policy decision distribution function, such as the Policy and Charging Rules Function (PCRF) in the 3GPP, in the cellular network may generate a control policy according to the user subscription information, service information, user status information or other inputs, and sends a control policy to the WLAN policy distribution function, which is in the WMS. The WLAN policy distribution function further distributes WLAN user policy information to the WLAN policy execution function, which may be in the WLAN gateway of the WLAN, such as AC or FAT AP.

First Embodiment

Figure 6:
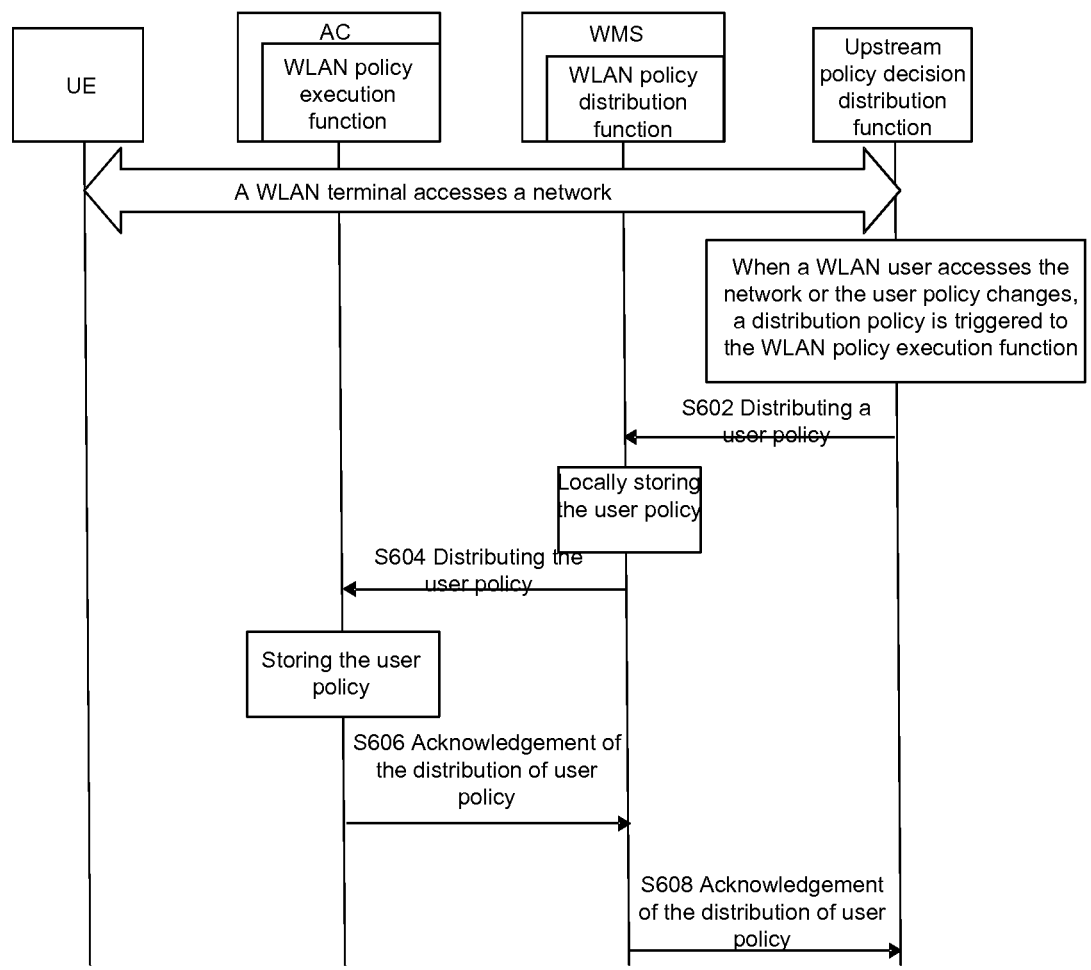
FIG. 6 is a of actively sending a user policy by an upstream policy decision distribution device according to the first embodiment of the disclosure.

FIG. 6 is a flowchart of actively sending a user policy by an upstream policy decision distribution device according to the first embodiment of the disclosure, as shown in FIG. 6, including the following steps (Step 602-Step 608).

Step 602, The WLAN user terminal accesses a network through the WLAN, and after the upstream policy decision distribution function (such as the policy decision point of a user in a subscription operator network, PCRF function in the 3G network for example) knows that the WLAN user terminal accesses the network, a WLAN user policy is sent to the WLAN user policy distribution function in the WMS according to the obtained WLAN user identity (such as Network Access Identifier (NAI), International Mobile Subscriber Identification Number (IMSI), Media Access Control (MAC) address and user name). For example, the upstream policy decision distribution function can know that the WLAN terminal accesses the network from the access authentication process of the user terminal or in other ways. The WLAN identifier is the only one for identifying the user identity; and the WLAN user policy includes a policy and charging rule, a Quality of Service (QoS) policy rule and the like, with the details referring to the related definition of 3GPP TS23.303.

In addition, when the WLAN user policy is dynamically updated, the upstream policy decision distribution function may be triggered to actively send an updating policy to the WLAN user policy distribution function.

Step 604, The WLAN user policy distribution function sends the WLAN user policy to the policy execution function of the WLAN which the WLAN user terminal accesses currently, such as an AC. After the WLAN user terminal accesses the WLAN, the WLAN user policy distribution function can access a network element reporter through the WLAN to acquire the user policy execution function point where the WLAN user terminal is currently located.

Step 606, After receiving the WLAN user policy information from the WLAN user policy distribution function, the WLAN policy execution function stores the user policy information of the WLAN user and returns an acknowledgement message to the WLAN user policy distribution function.

Step 608, After receiving the acknowledgement message from the WLAN policy execution function, the WLAN user policy distribution function returns an acknowledgement message to the policy decision distribution function.

Second Embodiment

Figure 7:
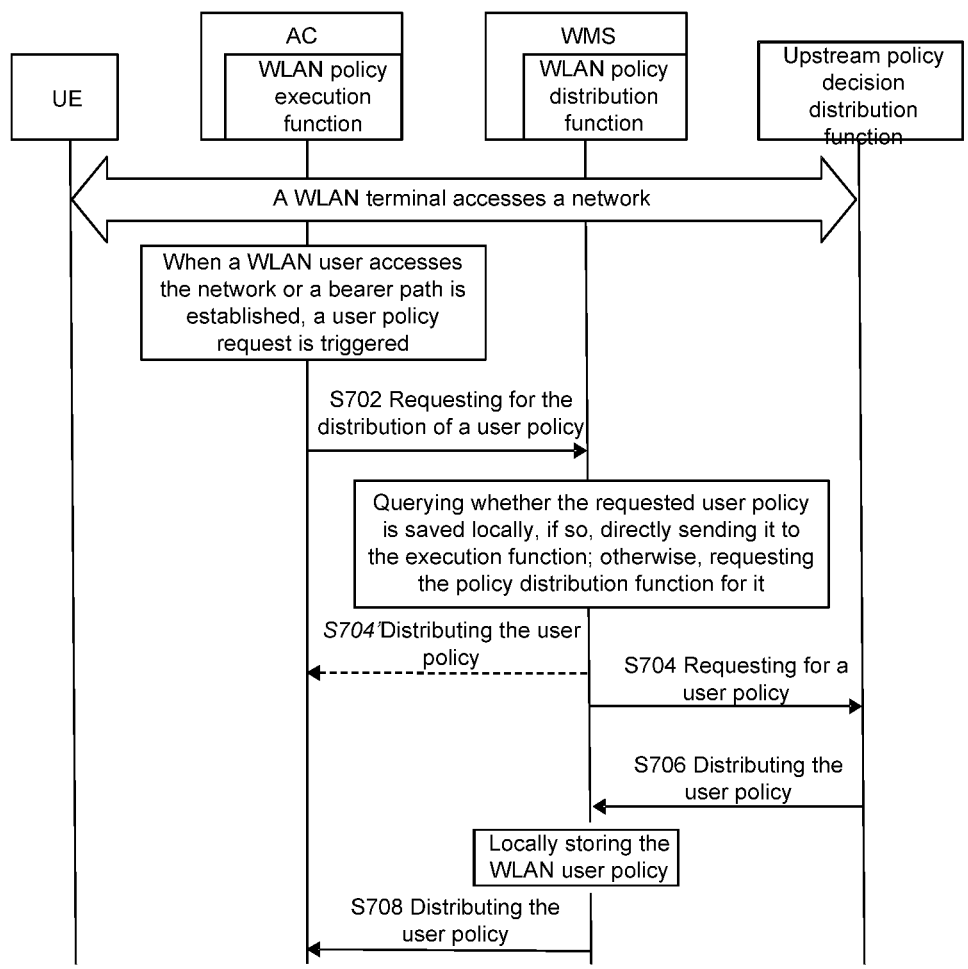
FIG. 7 is a flowchart of requesting for a WLAN user policy by a WLAN user policy execution device according to the second embodiment of the disclosure.

FIG. 7 is a flowchart of requesting for a WLAN user policy by a WLAN user policy execution device according to the second embodiment of the disclosure, as shown in FIG. 7, including the following steps (Step 702-Step 708).

Step 702, After the WLAN user terminal accesses a network through the WLAN, the WLAN policy execution function initiates a WLAN user policy request to the WLAN user policy distribution function after feeling that the WLAN user accesses the network or a corresponding bearer path is established for the user. For example, after the access authentication process of the WLAN terminal is successful, the WLAN policy execution function can be triggered to initiate the WLAN user policy request, but the triggering form is not limited to this.

Step 704, After receiving the WLAN user policy request from the WLAN policy execution function, the WLAN user policy distribution function queries whether the requested WLAN user policy is saved locally according to the WLAN user identity in the request. If the related information is not saved locally, the request is forwarded to the upstream policy decision distribution function (see Step 704' in FIG. 7); and if the policy file of the WLAN user is saved locally, the policy is directly sent to the WLAN policy execution function.

Step 706, After receiving the WLAN user policy request from the WLAN user policy distribution function, the upstream policy decision distribution function sends the policy of the user to the WLAN user policy distribution function according to the WLAN user identity in the request.

Step 708, After receiving the WLAN user policy from the policy distribution function, the WLAN user policy distribution function locally stores the user policy information and forwards the user policy information to the policy execution point that the WLAN user currently accesses.

Third Embodiment

Figure 8:
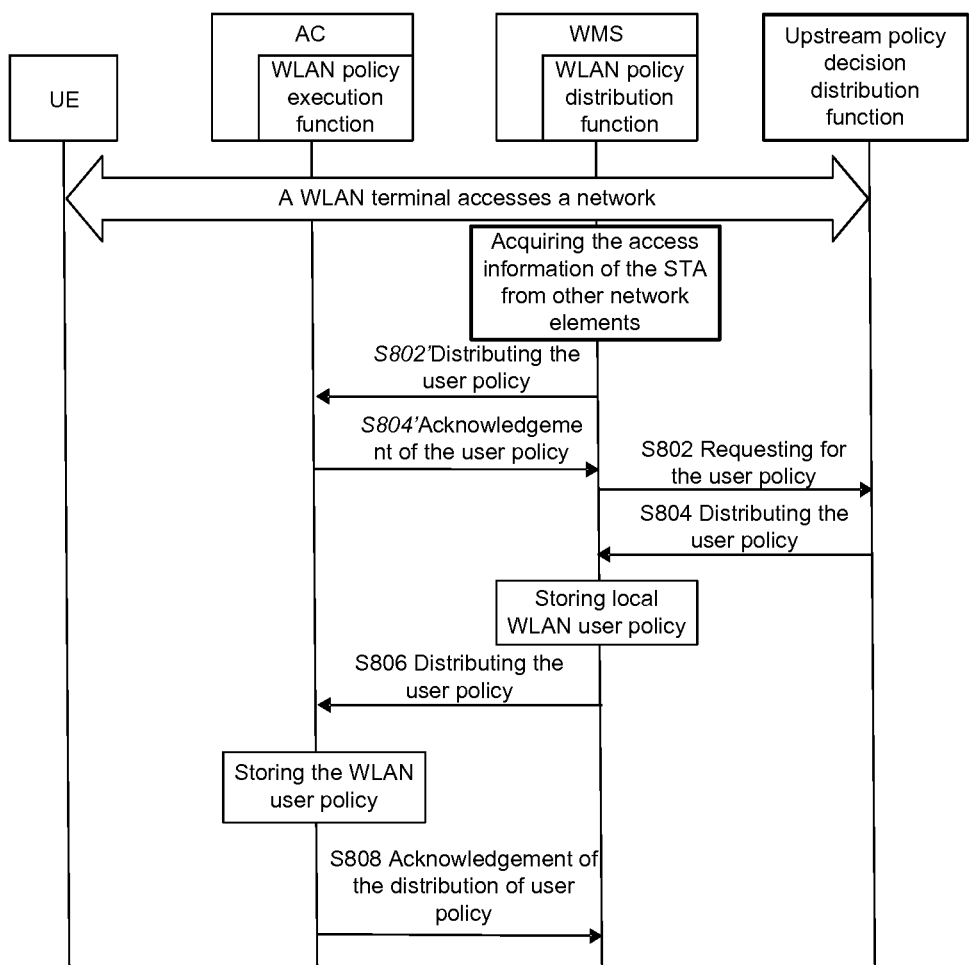
FIG. 8 is a flowchart of distributing a user policy by a WLAN user policy distribution device according to the third embodiment of the disclosure.

FIG. 8 is a flowchart of distributing a user policy by a WLAN user policy distribution device according to the third embodiment of the disclosure, as shown in FIG. 8, including the following steps (Step 802-Step 808).

Step 802, The WLAN user policy distribution function maintains the access information of the WLAN user terminal and finds whether the WLAN user policy information is saved locally according to the WLAN user identity after knowing that the WLAN terminal accesses the network (for example, the WMS can acquire the access information of the user from the AP/AC so that the WLAN user policy distribution function acquires the access information of the WLAN user). If the related information is not saved locally, the user policy request is sent to the upstream policy decision distribution function, and if the policy information of the WLAN user is locally saved, it is directly sent to the WLAN policy execution function (see Step 802' and Step 804' in FIG. 8).

Step 804, The upstream policy decision distribution function receives a user policy request and sends a user policy to the WLAN user policy distribution function according to the WLAN user identifier in the request.

Step 806, After receiving the user policy, the WLAN user policy distribution function locally saves the policy information of the user and sends the policy to the WLAN policy execution function that the WLAN user accesses.

Step 808, The WLAN policy execution function receives the sent policy information, saves it and returns an acknowledgement message to the WLAN user policy distribution function.

To sum up, the technical solution provided by the disclosure solves the absence of a necessary policy control and management mechanism in the existing WLAN, and implements the WLAN user policy control conveniently, quickly and effectively.

Obviously, those skilled in the art shall understand that the modules or steps of the disclosure may be implemented by general computing apparatus and centralized in a single computing apparatus or distributed in a network consisting of multiple computing apparatus. Optionally, the modules or steps may be implemented by program codes executable by the computing apparatus, so that they may be stored in a storage apparatus and executed by the computing apparatus, and, in some cases, the steps can be executed in a sequence different from the illustrated or described sequence, or they are respectively made into the integrated circuit modules or many of them are made into a single integrated circuit module. By doing so, the disclosure is not limited to any specific combination of hardware and software.

The above are only the preferred embodiments of the disclosure and not intended to limit the disclosure. For those skilled in the art, various modifications and changes can be made in the disclosure. Any modifications, equivalent replacements, improvements and the like within the spirit and principle of the disclosure shall fall within the scope of protection of the disclosure.

The invention claimed is:

1. A device for distributing a Wireless Local Access Network (WLAN) user policy, comprising a hardware processor, configured to execute modules on a memory, the modules comprising:
   a first receiving module, configured to receive a WLAN user policy actively sent by an upstream policy decision distribution device; and
   a first forwarding module, configured to forward the WLAN user policy to a WLAN user policy execution device;
   wherein the device for distributing the WLAN user policy is a WLAN Mobility Server (WMS) and the WLAN user policy execution device is an Access Control (AC);
   the modules further comprising:
   a second receiving module, configured to receive a WLAN user policy request from the WLAN user policy execution device;
   a second forwarding module, configured to forward the WLAN user policy request to the upstream policy decision distribution device;
   a third receiving module, configured to receive a WLAN user policy corresponding to the WLAN user policy request from the upstream policy decision distribution device; and
   a third forwarding module, configured to forward the WLAN user policy corresponding to the WLAN user policy request to the WLAN user policy execution device.

2. The device according to claim 1, the modules further comprising:
   a first sending module, configured to actively send a WLAN user policy request to the upstream policy decision distribution device;
   a fourth receiving module, configured to receive the WLAN user policy corresponding to the WLAN user policy request actively sent by the first sending module from the upstream policy decision distribution device; and
   a fourth forwarding module, configured to forward the WLAN user policy corresponding to the WLAN user policy request actively sent by the first sending module to the WLAN user policy execution device.

3. The device according to claim 2, wherein
   the WLAN user policy actively sent by the upstream policy decision distribution device comprises: a WLAN user policy sent by the upstream policy decision distribution device which knows the access of a WLAN user terminal according to the WLAN user identifier of the WLAN user terminal and corresponding to the WLAN user terminal; and/or
   the WLAN user policy request sent by the WLAN user policy execution device comprises: a WLAN user policy request sent from the WLAN user policy execution device which knows the access of a WLAN user terminal or establishes a bearer path for the WLAN user terminal to the second receiving module, the WLAN user policy request comprising the WLAN user identifier of the WLAN user terminal; and/or
   the first sending module is configured to actively send a WLAN user policy request to the upstream policy decision distributing device after knowing the access of a WLAN user terminal, the WLAN user policy request comprising the WLAN user identifier of the WLAN user terminal.

4. The device according to claim 3, the modules further comprising:
   a first judgment module, which is configured to, after the second receiving module receives the WLAN user policy request from the WLAN user policy execution device, judge whether a WLAN user policy corresponding to the WLAN user policy request is saved locally, if the WLAN user policy corresponding to the WLAN user policy request is saved locally, directly send the WLAN user policy to the WLAN user policy execution device, otherwise, trigger the second forwarding module; and/or
   a second judgment module, which is configured to, after knowing the access of a WLAN user terminal, judge whether the WLAN user policy corresponding to the WLAN user terminal is saved locally, if the WLAN user policy corresponding to the WLAN user terminal is saved locally, directly send the WLAN user policy to the WLAN user policy execution device, otherwise, trigger the first sending module.

5. A method for distributing a WLAN user policy, comprising:
   receiving, by a WLAN user policy distribution device, a WLAN user policy actively sent by an upstream policy decision distribution device; and
   forwarding, by the WLAN user policy distribution device, the WLAN user policy to a WLAN user policy execution device;
   wherein a WLAN user policy distribution device is a WLAN Mobility Server (WMS) and the WLAN user policy execution device is an Access Control (AC);
   the method further comprising:
   by the WLAN user policy distribution device, receiving a WLAN user policy request from the WLAN user policy execution device and forwarding the WLAN user policy request to the upstream policy decision distribution device; and
   by the WLAN user policy distribution device, receiving a WLAN user policy corresponding to the WLAN user policy request from the upstream policy decision distribution device and forwarding the WLAN user policy to the WLAN user policy execution device.

6. The method according to claim 5, further comprising:
actively sending, by the WLAN user policy distribution device, a WLAN user policy request to the upstream policy decision distribution device; and
by the WLAN user policy distribution device, receiving the WLAN user policy corresponding to the WLAN user policy request actively sent by the WLAN user policy distribution device from the upstream policy decision distribution device and forwarding the WLAN user policy to the WLAN user policy execution device.

7. The method according to claim 6, wherein
the WLAN user policy actively sent by the upstream policy decision distribution device comprises: a WLAN user policy sent by the upstream policy decision distribution device which knows the access of a WLAN user terminal according to the WLAN user identifier of the WLAN user terminal and corresponding to the WLAN user terminal; and/or
the WLAN user policy request sent by the WLAN user policy execution device comprises: a WLAN user policy request sent from the WLAN user policy execution device which knows the access of a WLAN user terminal or establishes a bearer path for the WLAN user terminal to the WLAN user policy execution device, the WLAN user policy request comprising the WLAN user identifier of the WLAN user terminal; and/or
the WLAN user policy request actively sent from the WLAN user policy distribution device to the upstream policy decision distribution device comprises: a WLAN user policy request actively sent from the WLAN user policy distribution device which knows the access of a WLAN user terminal to the upstream policy decision distribution device, the WLAN user policy request comprising the WLAN user identifier of the WLAN user terminal.

8. The method according to claim 7, wherein
after the WLAN user policy distribution device receives the WLAN user policy request from the WLAN user policy execution device, the method may further comprise the following steps of: judging, by the WLAN user policy distribution device, whether a WLAN user policy corresponding to the WLAN user policy request is locally saved; if the WLAN user policy corresponding to the WLAN user policy request is locally saved, directly sending the WLAN user policy to the WLAN user policy execution device; otherwise, forwarding the WLAN user policy request to the upstream policy decision distribution device; and/or
after the WLAN user policy distribution device knows the access of a WLAN user terminal, the method may further comprise the following steps of: judging, by the WLAN user policy distribution device, whether a WLAN user policy corresponding to the WLAN user terminal is locally saved; if the WLAN user policy corresponding to the WLAN user policy request is locally saved, directly sending the WLAN user policy to the WLAN user policy execution device; otherwise, actively sending the WLAN user policy request to the upstream policy decision distribution device.

\* \* \* \* \*